(12) United States Patent
Elkovitch et al.

(10) Patent No.: US 7,132,063 B2
(45) Date of Patent: *Nov. 7, 2006

(54) POLY(ARYLENE ETHER)/POLYAMIDE COMPOSITION

(75) Inventors: Mark D. Elkovitch, Selkirk, NY (US); James Ross Fishburn, Slingerlands, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/903,150

(22) Filed: Jul. 30, 2004

(65) Prior Publication Data

US 2005/0038191 A1    Feb. 17, 2005

Related U.S. Application Data

(60) Provisional application No. 60/495,357, filed on Aug. 16, 2003.

(51) Int. Cl.
*C08L 77/00* (2006.01)

(52) U.S. Cl. ............... 252/500; 524/504; 524/505; 524/508; 524/514; 525/66; 525/92 B; 525/391; 525/397

(58) Field of Classification Search ............ 525/66, 525/92 B, 391, 397; 524/504, 505, 508, 524/514; 252/500
See application file for complete search history.

(56) References Cited

U.S. PATENT DOCUMENTS

| | | | |
|---|---|---|---|
| 4,315,086 A | 2/1982 | Uenon et al. |
| 4,600,741 A | 7/1986 | Aycock et al. |
| 4,659,760 A | 4/1987 | Van der Meer |
| 4,732,938 A | 3/1988 | Grant et al. |
| 4,745,157 A | 5/1988 | Yates, III et al. |
| 4,798,865 A | 1/1989 | Grant et al. |
| 4,808,671 A | 2/1989 | Sivavec |
| 4,826,933 A | 5/1989 | Grant et al. |
| 4,859,739 A | 8/1989 | Yates, III et al. |
| 4,863,966 A | 9/1989 | Black et al. |
| 4,863,996 A | 9/1989 | Nakazima et al. |
| 4,873,276 A | 10/1989 | Fujii et al. |
| 4,873,286 A | 10/1989 | Gallucci et al. |
| 4,874,810 A | 10/1989 | Lee, Jr. et al. |
| 4,923,924 A | 5/1990 | Grant et al. |
| 4,929,675 A | 5/1990 | Abe et al. |
| 4,957,966 A | 9/1990 | Nishio et al. |
| 4,960,825 A | 10/1990 | Van der Meer |
| 4,963,620 A | 10/1990 | Grant et al. |
| 4,994,525 A | 2/1991 | Brown et al. |
| 4,997,612 A | 3/1991 | Gianchandai et al. |
| 5,000,897 A | 3/1991 | Chambers |
| 5,059,646 A | 10/1991 | Morioka et al. |
| 5,086,105 A | 2/1992 | Abe et al. |
| 5,104,937 A | 4/1992 | Saito et al. |
| 5,104,939 A | 4/1992 | Van der Meer et al. |
| 5,109,052 A | 4/1992 | Kasai et al. |
| 5,109,065 A | 4/1992 | Saito et al. |
| 5,122,576 A | 6/1992 | White et al. |
| 5,132,365 A | 7/1992 | Gallucci |
| 5,134,196 A | 7/1992 | Van der Meer |
| 5,135,983 A | 8/1992 | Morioka |
| 5,162,433 A | 11/1992 | Nishio et al. |
| 5,237,002 A | 8/1993 | Nishio et al. |
| 5,248,728 A | 9/1993 | Lee, Jr. |
| 5,260,359 A * | 11/1993 | Muehlbach et al. ......... 524/80 |
| 5,260,374 A | 11/1993 | Gallucci |
| 5,288,786 A | 2/1994 | Nishio et al. |
| 5,296,533 A | 3/1994 | Nagaoka et al. |
| 5,304,593 A | 4/1994 | Nishio et al. |
| 5,310,821 A | 5/1994 | Kodaira et al. |
| 5,324,782 A | 6/1994 | Lee, Jr. |
| 5,334,636 A | 8/1994 | Fujii et al. |
| 5,397,838 A | 3/1995 | Ohtomo et al. |
| 5,403,888 A | 4/1995 | Nishio et al. |
| 5,405,902 A | 4/1995 | Nishio et al. |
| 5,470,902 A | 11/1995 | Kubo et al. |
| 5,470,913 A | 11/1995 | Van der Meer et al. |
| 5,475,049 A | 12/1995 | Ohtomo et al. |
| 5,506,305 A | 4/1996 | Nagaoka et al. |
| 5,521,244 A | 5/1996 | Yates et al. |
| 5,554,693 A | 9/1996 | Ohtomo et al. |
| 5,719,233 A | 2/1998 | Gallucci et al. |
| 5,723,539 A | 3/1998 | Gallucci et al. |
| 5,741,846 A | 4/1998 | Lohmeijer et al. |
| 5,760,125 A | 6/1998 | Ohtomo et al. |
| 5,859,130 A | 1/1999 | Gianchandai et al. |
| 5,859,176 A | 1/1999 | Nakahashi et al. |
| 5,916,970 A | 6/1999 | Lee, Jr. et al. |
| 5,977,240 A | 11/1999 | Marie Lohmeijer et al. |

(Continued)

FOREIGN PATENT DOCUMENTS

EP    0924261 A1    6/1999

(Continued)

OTHER PUBLICATIONS

JP2004-083792. Application Date 2004-083792 (Machine Translation).

(Continued)

Primary Examiner—Ana Woodward

(57) ABSTRACT

A composition comprises two or more impact modifiers and a compatibilized blend of a poly(arylene ether) and an aliphatic-aromatic polyamide. The polyamide is composed of dicarboxylic acid units comprising 60 to 100 mol % of terephthalic acid units and diamine units comprising 60 to 100 mol % of 1,9-nonanediamine units and/or 2-methyl-1, 8-octanediamine units. The polyamide has an amine end group content greater than 45 micromoles per gram of polyamide.

20 Claims, No Drawings

U.S. PATENT DOCUMENTS

| | | |
|---|---|---|
| 6,171,523 B1 | 1/2001 | Silvi et al. |
| 6,180,716 B1 | 1/2001 | Majumdar |
| 6,319,986 B1 | 11/2001 | Amimoto et al. |
| 6,362,263 B1 | 3/2002 | Brown et al. |
| 2003/0023008 A1 | 1/2003 | Uchida et al. |
| 2003/0088027 A1 | 5/2003 | Chin et al. |
| 2004/0034152 A1 | 2/2004 | Oka et al. |

FOREIGN PATENT DOCUMENTS

| | | | |
|---|---|---|---|
| EP | 1 024 171 | | 1/2000 |
| EP | 1170335 | | 7/2001 |
| EP | 1375578 | | 6/2003 |
| JP | 5-339496 | * | 12/1993 |
| JP | 2000-212434 | * | 8/2000 |

OTHER PUBLICATIONS

JP2000-212433. Publication Date: Feb. 8, 2000 (Machine Translation).

JP2000-212434. Publication Date: Feb. 8, 2000 (Machine Translation).

JP2003 041117. Feb. 13, 2003 Abstract Only.

ASTM D 570-98 "Standard Test Method for Water Absorption of Plastics". p. 1-4.

ASTM D 256-04 "Standard Test Methods for Determining the Izod Pendulum Impact Resistance of Plastics". pp. 1-20.

ASTM D 3763-02 "Standard Test Method for High Speed Puncture Properties of Plastics Using Load and Displacement Sensors" pp. 1-10.

UL94 "Test for Flammability of Plastic Materials for Parts in Devices and Appliances" Fifth Edition Dated Oct. 29, 1996.

JP2004-083792. Publication Date Mar. 18, 2004. (Manual Translation).

JP1997087483A. Publication Date. Mar. 31, 1997 (Manual Translation).

JP2000-212433. Publication date Aug. 2, 2000. Manual Translation.

JP2000-212434. Publication date Aug. 2, 2000. Manual Translation.

* cited by examiner

POLY(ARYLENE ETHER)/POLYAMIDE COMPOSITION

CROSS REFERENCE TO RELATED APPLICATIONS (if applicable)

This application claims priority to U.S. Provisional Application No. 60/495,357 filed on Aug. 16, 2003, which is incorporated by reference herein.

BACKGROUND OF INVENTION

The Disclosure Relates to poly(arylene ether)/polyamide Compositions.

Poly(arylene ether)/aliphatic polyamide compositions are widely used. Despite their wide use compositions employing aliphatic polyamides can suffer from drawbacks such as undesirably low dimensional stability, and high moisture absorption. Attempts have been made to improve the physical property profile by altering the polyamide structure to include aromatic elements. These aliphatic-aromatic polyamides have a variety of attributes but the resulting blends with poly(arylene ether), when they can be made without degradation, do not achieve a balance of desirable properties. Desirable properties include high dimensional stability, low moisture absorption, high impact strength at high and low temperatures, and processability.

Accordingly there is a need for a poly(arylene ether)/aliphatic-aromatic polyamide composition having an advantageous combination of the foregoing properties.

BRIEF DESCRIPTION OF THE INVENTION

The above mentioned need is addressed by a composition comprising:

a first impact modifier comprising a block copolymer of an alkenyl aromatic compound and a conjugated diene, a hydrogenated block copolymer of an alkenyl aromatic compound and a conjugated diene or a combination thereof;

a second impact modifier comprising a functionalized elastomeric polyolefin; and a compatibilized blend of a poly(arylene ether) and an aliphatic-aromatic polyamide. The polyamide is composed of dicarboxylic acid units comprising 60 to 100 mol % of terephthalic acid units and diamine units comprising 60 to 100 mol % of 1,9-nonanediamine units and/or 2-methyl-1,8-octanediamine units. The polyamide has an amine end group content greater than 45 micromoles per gram of polyamide.

DETAILED DESCRIPTION

The composition disclosed herein comprises a compatibilized blend of poly(arylene ether) and an aliphatic-aromatic polyamide as well as at least two impact modifiers. The polyamide comprises dicarboxylic acid units and diamine units. At least 60 mol % of the dicarboxylic acid units are terephthalic acid units and at least 60 mol % of the diamine units are 1,9-nonanediamine units and/or 2-methyl-1,8-octanediamine units. The combination of aromatic units and nine carbon aliphatic units results in a polyamide having a unique combination of melt temperature, low water absorption, and dimensional stability, which, when employed in a poly(arylene ether)/polyamide blend, results in a composition having excellent dimensional stability and water absorption.

Remarkably, it has been found that a combination of two impact modifiers gives improved impact strength. In contrast, the same combination of impact modifiers does not improve impact strength in poly(arylene ether)/aliphatic polyamide blends when compared to compositions containing a block copolymer as an impact modifier. Thus, the compatibilized poly(arylene ether)/polyamide blend described herein has a desirable combination of physical properties including good dimensional stability as evidenced by low water absorption, and high impact resistance-even at low temperatures.

In one embodiment, the composition has a water absorption value less than or equal to 0.3 after 24 hours, or more specifically, less than or equal to 0.25 after 24 hours, or, even more specifically less than or equal to 0.2 after 24 hours, as determined by ASTM D 570.

Impact resistance can be determined using a Notched Izod (NI) test according to ASTM D256. In one embodiment the composition has a NI value at 23° C. greater than or equal to 200 Joules per meter (J/m), or, more specifically, greater than or equal to 220, or, even more specifically, greater than or equal to 240 J/m. Additionally, the composition may have a NI at −30° C. greater than or equal to 150 J/m, or, more specifically, greater than or equal to 160 J/m, or even more specifically, greater than or equal to 170 J/m.

As used herein, a "poly(arylene ether)" comprises a plurality of structural units of the formula (I):

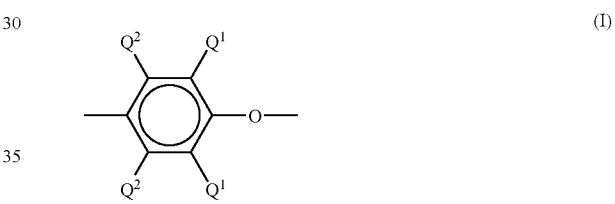

wherein for each structural unit, each $Q^1$ is independently halogen, primary or secondary lower alkyl (e.g., an alkyl containing 1 to 7 carbon atoms), phenyl, haloalkyl, aminoalkyl, alkenylalkyl, alkynylalkyl, hydrocarbonoxy, and halohydrocarbonoxy wherein at least two carbon atoms separate the halogen and oxygen atoms; and each $Q^2$ is independently hydrogen, halogen, primary or secondary lower alkyl, phenyl, haloalkyl, aminoalkyl, alkenylalkyl, alkynylalkyl, hydrocarbonoxy, halohydrocarbonoxy wherein at least two carbon atoms separate the halogen and oxygen atoms. In some embodiments, each $Q^1$ is independently alkyl or phenyl, for example, $C_{1-4}$ alkyl, and each $Q^2$ is independently hydrogen or methyl. The poly(arylene ether) may comprise molecules having aminoalkyl-containing end group(s), typically located in an ortho position to the hydroxy group. Also frequently present are 4-hydroxybiphenyl end groups, typically obtained from reaction mixtures in which a by-product diphenoquinone is present.

The poly(arylene ether) may be in the form of a homopolymer; a copolymer; a graft copolymer; an ionomer; a block copolymer, for example comprising arylene ether units and blocks derived from alkenyl aromatic compounds; as well as combinations comprising at least one of the foregoing. Poly(arylene ether) includes polyphenylene ether containing 2,6-dimethyl-1,4-phenylene ether units optionally in combination with 2,3,6-trimethyl-1,4-phenylene ether units.

The poly(arylene ether) may be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing.

The poly(arylene ether) can have a number average molecular weight of 3,000 to 40,000 atomic mass units (amu) and a weight average molecular weight of 5,000 to 80,000 amu, as determined by gel permeation chromatography. The poly(arylene ether) can have an intrinsic viscosity of 0.10 to 0.60 deciliters per gram (dl/g), or, more specifically, 0.29 to 0.48 dl/g, as measured in chloroform at 25° C. It is possible to utilize a combination of high intrinsic viscosity poly(arylene ether) and a low intrinsic viscosity poly(arylene ether). Determining an exact ratio, when two intrinsic viscosities are used, will depend somewhat on the exact intrinsic viscosities of the poly(arylene ether) used and the ultimate physical properties that are desired.

The composition may contain poly(arylene ether) in an amount of 10 weight percent to 70 weight percent based on the combined weight of poly(arylene ether), polyamide and impact modifier. Within this range the amount of poly (arylene ether) may be greater than or equal to 15, or, more specifically, greater than or equal to 20 weight percent. Also within this range the amount of poly(arylene ether) may be less than or equal to 65, or, more specifically, less than or equal to 60 weight percent.

The aliphatic-aromatic polyamide comprises units derived from one or more dicarboxylic acid and units derived from one or more diamine. 60 to 100 mol % of the dicarboxylic acid units, based on the total moles of dicarboxylic acid units, are derived from terephthalic acid. Within this range the amount of terephthalic acid units may be greater than or equal to 75 mol %, or, more specifically, greater than or equal to 90 mol %.

Examples of other dicarboxylic acid units that may be used in addition to the terephthalic acid units include units derived from aliphatic dicarboxylic acids such as malnic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, azelaic acid, sebacic acid and suberic acid; alicyclic dicarboxylic acids such as 1,3-cyclopentanedicarboxylic acid and 1,4-cyclohexanedicarboxylic acid; and aromatic dicarboxylic acids such as isophthalic acid, 2,6-naphthalenedicarboxylic acid, 2,7-naphthalenedicarboxylic acid, 1,4-naphthalenedicarboxylic acid, 1,4-phenylenedioxy-diacetic acid, 1,3-phenylenedioxy-diacetic acid, diphenic acid, 4,4'-oxydibenzoic acid, diphenylmethane-4,4'-dicarboxylic acid, diphenylsulfone-4,4'-dicarboxylic acid and 4,4'-biphenyldicarboxylic acid. These can be used singly or in combinations of two or more types. In some embodiments units derived from aromatic dicarboxylic acids are desirable. In one embodiment the content of these other dicarboxylic acid units in the dicarboxylic acid units (a) is less than or equal to 25 mol %, or, more specifically, less than or equal to 10 mol %. Units derived from polyfunctionalized carboxylic acids such as trimellitic acid, trimesic acid and pyromellitic acid may also be included to the extent that melt molding is still possible.

The aliphatic-aromatic polyamide comprises units derived from one or more diamines. 60 to 100 mol % of the diamine units, based on the total moles of diamine units, are derived from 1,9-nonanediamine units and/or 2-methyl-1,8-octanediamine units. Within this range the amount of 1,9-nonanediamine units and/or 2-methyl-1,8-octanediamine units may be greater than or equal to 75 mol %, or, more specifically, greater than or equal to 90 mol %.

The molar ratio of the 1,9-nonanediamine units to the 2-methyl-1,8-octanediamine units may be 100:0 to 20:80, or, more specifically, 100:0 to 50:50, or, even more specifically, 100:0 to 50:40. This can be referred to as the N/I ratio.

Examples of other diamine units that may be used in addition to the 1,9-nonanediamine units and/or 2-methyl-1,8-octanediamine units include units derived from linear aliphatic diamines such as 1,6-hexanediamine, 1,7-heptanediamine, 1,8-octanediamine, 1,10-decanediamine, 1,11-undecanediamine and 1,12-dodecanediamine; branched aliphatic diamines such as 2-methyl-1,5-pentanediamine, 3-methyl-1,5-pentanediamine, 2,2,4-trimethyl-1,6-hexanediamine, 2,4,4-trimethyl-1,6-hexanediamine and 5-methyl-1,9-nonanediamine; alicyclic diamines such as cyclohexanediamine, methylcyclohexanediamine, isophoronediamine, bis(4-aminocyclohexyl)methane, norbornanedimethylamine and tricyclodecanedimethylamine; and aromatic diamines such as p-phenylenediamine, m-phenylenediamine, m-xylylenediamine, p-xylylenediamine, 4,4'-diaminodiphenylsulfone and 4,4'-diaminodiphenyl ether. These can be used singly or in combinations of two or more types. In one embodiment, units derived from 1,6-hexanediamine, 1,7-heptanediamine, 1,8-octanediamine, 1,10-decanediamine and/or 1,12-dodecanediamine are combined with the 1,9-nonanediamine units and/or 2-methyl-1,8-octanediamine units.

The aliphatic-aromatic polyamide can be manufactured by any known method for manufacturing crystalline polyamides. For example, it can be manufactured by solution polymerization or interfacial polymerization in which an acid chloride and a diamine are used as raw materials, or by melt polymerization, solid-phase polymerization, or melt extrusion polymerization in which a dicarboxylic acid and a diamine are used as raw materials.

The intrinsic viscosity of the aliphatic-aromatic polyamide, measured in concentrated sulfuric acid at 30° C., may be 0.4 to 3.0 dl/g, or, more specifically, 0.5 to 2.0 dl/g, or, even more specifically, 0.6 to 1.8 dl/g.

The melt viscosity of the aliphatic-aromatic polyamide may be 300 to 3500 poise at a shear rate of $1000 \text{ s}^{-1}$ and a temperature of 330° C., as measured by capillary viscometry. Within this range, the melt viscosity may be greater than or equal to 325, or, more specifically, greater than or equal to 350 poise. Also within this range, the melt viscosity may be less than or equal to 3300, or, more specifically, less than or equal to 3100 poise.

The aliphatic-aromatic polyamide has an amine end group content greater than or equal to 45 micromoles per gram of polyamide, or more specifically, greater than or equal to 50 micromoles, or, even more specifically, greater than or equal to 55 micromoles per gram of polyamide. Amine end group content may be determined by dissolving the polyamide in a suitable solvent, optionally with heat. The polyamide solution is titrated with 0.01 Normal hydrochloric acid (HCl) solution using a suitable indication method. The amount of amine end groups can be calculated based the volume of HCl solution added to the sample, the volume of HCl used for the blank, the molarity of the HCl solution and the weight of the polyamide sample.

The compatibilized blend may additionally comprise an aliphatic polyamide such as nylon 6, 6/6, 6/69, 6/10, 6/12, 11, 12, 4/6, 6/3, 7, 8, 6T, modified 6T, polyphthalamides (PPA), and combinations of two or more of the foregoing.

The composition may contain aliphatic-aromatic polyamide in an amount of 5 weight percent to 80 weight percent based on the combined weight of poly(arylene ether), polyamide and impact modifier. Within this range the amount of aliphatic-aromatic polyamide may be greater than or equal to 10, or, more specifically, greater than or equal to 15 weight percent. Also within this range the amount of aliphatic-aromatic polyamide may be less than or equal to 70, or, more specifically, less than or equal to 60 weight percent.

The compatibilized poly(arylene ether)/aliphatic-aromatic polyamide blend is formed using a compatibilizing agent. When used herein, the expression "compatibilizing agent" refers to polyfunctional compounds which interact with the poly(arylene ether), the polyamide resin, or both. This interaction may be chemical (e.g., grafting) and/or physical (e.g., affecting the surface characteristics of the dispersed phases). In either instance the resulting compatibilized poly(arylene ether)/polyamide composition appears to exhibit improved compatibility, particularly as evidenced by enhanced impact strength, mold knit line strength and/or elongation. As used herein, the expression "compatibilized poly(arylene ether)/aliphatic-aromatic polyamide blend" refers to those compositions which have been physically and/or chemically compatibilized with a compatibilizing agent.

The compatibilizing agent comprises a polyfunctional compound that is one of two types. The first type has in the molecule both (a) a carbon-carbon double bond and b) at least one carboxylic acid, anhydride, epoxy, imide, amide, ester group or functional equivalent thereof. Examples of such polyfunctional compounds include maleic acid; maleic anhydride; fumaric acid; maleic hydrazide; dichloro maleic anhydride; and unsaturated dicarboxylic acids (e.g. acrylic acid, butenoic acid, methacrylic acid, t-ethylacrylic acid, pentenoic acid). In one embodiment, the compatibilizing agent comprises maleic anhydride and/or fumaric acid.

The second type of polyfunctional compatibilizing agent compounds are characterized as having both (a) a group represented by the formula (OR) wherein R is hydrogen or an alkyl, aryl, acyl or carbonyl dioxy group and (b) at least two groups each of which may be the same or different selected from carboxylic acid, acid halide, anhydride, acid halide anhydride, ester, orthoester, amide, imido, amino, and salts thereof. Typical of this type of compatibilizing agents are the aliphatic polycarboxylic acids, acid esters and acid amides represented by the formula:

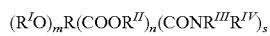

$(R^{I}O)_m R(COOR^{II})_n (CONR^{III}R^{IV})_s$ wherein R is a linear or branched chain saturated aliphatic hydrocarbon having 2 to 20, or, more specifically, 2 to t 10 carbon atoms; $R^{I}$ is hydrogen or an alkyl, aryl, acyl or carbonyl dioxy group having 1 to 10, or, more specifically, 1 to 6, or, even more specifically, 1 to 4 carbon atoms; each $R^{II}$ is independently hydrogen or an alkyl or aryl group having 1 to 20, or, more specifically, 1 to 10 carbon atoms; each $R^{III}$ and $R^{IV}$ are independently hydrogen or an alkyl or aryl group having 1 to 10, or, more specifically 1 to 6, or, even more specifically, 1 to 4, carbon atoms; m is equal to 1 and (n+s) is greater than or equal to 2, or, more specifically, equal to 2 or 3, and n and s are each greater than or equal to zero and wherein $(OR^{I})$ is alpha or beta to a carbonyl group and at least two carbonyl groups are separated by 2 to 6 carbon atoms. Obviously, $R^{I}$, $R^{II}$, $R^{III}$ and $R^{IV}$ cannot be aryl when the respective substituent has less than 6 carbon atoms.

Suitable polycarboxylic acids include, for example, citric acid, malic acid, agaricic acid; including the various commercial forms thereof, such as for example, the anhydrous and hydrated acids; and combinations comprising one or more of the foregoing. In one embodiment, the compatibilizing agent comprises citric acid. Illustrative of esters useful herein include, for example, acetyl citrate and mono-and/or distearyl citrates and the like. Suitable amides useful herein include, for example, N,N'-diethyl citric acid amide; N-phenyl citric acid amide; N-dodecyl citric acid amide; N,N'-didodecyl citric acid amide and N-dodecyl malic acid. Derivates include the salts thereof, including the salts with amines and the alkali and alkaline metal salts. Exemplary of suitable salts include calcium malate, calcium citrate, potassium malate, and potassium citrate.

The foregoing compatibilizing agents may be added directly to the melt blend or pre-reacted with either or both the poly(arylene ether) and polyamide. In one embodiment, at least a portion of the compatibilizing agent is pre-reacted, either in the melt or in a solution of a suitable solvent, with all or a part of the poly(arylene ether). It is believed that such pre-reacting may cause the compatibilizing agent to react with the polymer and, consequently, functionalize the poly (arylene ether). For example, the poly(arylene ether) may be pre-reacted with maleic anhydride, fumaric acid and/or citric acid to form an anhydride and/or acid functionalized polyphenylene ether which has improved compatibility with the polyamide compared to a non-functionalized polyphenylene ether.

The amount of the compatibilizing agent used will be dependent upon the specific compatibilizing agent chosen and the specific polymeric system to which it is added.

In one embodiment, the compatibilizing agent is employed in an amount of 0.05 to 2.0 weight percent, based on the combined weight of poly(arylene ether), aliphatic-aromatic polyamide, and impact modifier. Within this range the amount of compatibilizing agent may be greater than or equal to 0.1, or, more specifically, greater than or equal to 0.2 weight percent. Also within this range the amount of compatibilizing agent may be less than or equal to 1.75, or, more specifically, less than or equal to 1.5 weight percent.

The composition further comprises two or more impact modifiers. The first type of impact modifiers includes block copolymers of an alkenyl aromatic compound and a conjugated diene and hydrogenated block copolymers of an alkenyl aromatic compound and a conjugated diene and combinations of two or more of the foregoing.

The block copolymers are copolymers comprising (A) at least one block derived from an alkenyl aromatic compound and (B) at least one block derived from a conjugated diene. Hydrogenated block copolymers are those in which the aliphatic unsaturated group content in the block (B) is reduced by hydrogenation. The arrangement of blocks (A) and (B) includes a linear structure and a so-called radial teleblock structure having branched chains.

Exemplary structures are linear structures embracing diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B. In some embodiments the linear structure comprises diblock, triblock, and tetrablock structures.

The alkenyl aromatic compound providing the block (A) is represented by formula:

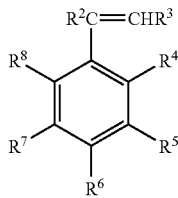

wherein $R^2$ and $R^3$ each independently represent a hydrogen atom, a $C_1$–$C_8$ alkyl group, a $C_2$–$C_8$ alkenyl group, or the like; $R^4$ and $R^8$ each independently represent a hydrogen atom, a $C_1$–$C_8$ alkyl group, a chlorine atom, a bromine atom, or the like; and $R^5$–$R^7$ each independently represent a hydrogen atom, a $C_1$–$C_8$ alkyl group, a $C_2$–$C_8$ alkenyl group, or the like, or $R^4$ and $R^5$ are taken together with the central aromatic ring to form a naphthyl group, or $R^5$ and $R^6$ are taken together with the central aromatic ring to form a naphthyl group.

Specific examples, of the alkenyl aromatic compounds include styrene, p-methylstyrene, alpha-methylstyrene, vinylxylenes, vinyltoluenes, vinylnaphthalenes, divinylbenzenes, bromostyrenes, chlorostyrenes, and the like, and combinations comprising at least one of the foregoing alkenyl aromatic compounds. In one embodiment the alkenyl aromatic compound is selected from styrene, alpha-methylstyrene, p-methylstyrene, vinyltoluenes, and vinylxylenes. In another embodiment the alkenyl aromatic compound is styrene.

Specific examples of the conjugated diene include 1,3-butadiene, 2-methyl-1,3-butadiene, 2,3-dimethyl-1,3-butadiene, 1,3-pentadiene, and the like.

In addition to the conjugated diene, the hydrogenated block copolymer may contain a small proportion of a lower olefinic hydrocarbon such as, for example, ethylene, propylene, 1-butene, dicyclopentadiene, a non-conjugated diene, or the like.

There is no particular restriction on the content of the repeating unit derived from the alkenyl aromatic compound in the block copolymers. Suitable alkenyl aromatic content may be 20 to 90 weight percent based on the total weight of the block copolymer. Within this range, the alkenyl aromatic content may be greater than or equal to 40 weight percent, or, more specifically, greater than or equal to 50 weight percent, or, even more specifically, greater than or equal to 55 weight percent. Also within this range, the alkenyl aromatic content may be less than or equal to 85 weight percent, or, more specifically, less than or equal to 75 weight percent.

There is no particular limitation on the mode of incorporation of the conjugated diene in the hydrogenated block copolymer backbone. For example, when the conjugated diene is 1,3-butadiene, it may be incorporated with 1% to 99% 1,2-incorporation with the remainder being 1,4-incorporation.

The hydrogenated block copolymer may be hydrogenated to such a degree that fewer than 50%, or, more specifically fewer than 20%, or, even more specifically, fewer than 10%, of the unsaturated bonds in the aliphatic chain moiety derived from the conjugated diene remain unreduced. The aromatic unsaturated bonds derived from the alkenyl aromatic compound may be hydrogenated to a degree of up to 25%.

The hydrogenated block copolymer may have a number average molecular weight of 5,000 to 500,000 AMU, as determined by gel permeation chromatography (GPC) using polystyrene standards. Within this range, the number average molecular weight may be at least 10,000 AMU, or more specifically greater than or equal to 30,000 AMU, or, even more specifically, greater than or equal to 45,000 AMU. Also within this range, the number average molecular weight may less than or equal to 300,000 AMU, or, more specifically less than or equal to 200,000 AMU, or, even more specifically, less than or equal to up to 150,000 AMU.

The molecular weight distribution of the hydrogenated block copolymer as measured by GPC is not particularly limited. The copolymer may have any ratio of weight average molecular weight to number average molecular weight.

Exemplary hydrogenated block copolymers are the styrene-(ethylene-butylene) diblock and styrene-(ethylene-butylene)-styrene triblock copolymers obtained by hydrogenation of styrene-butadiene and styrene-butadiene-styrene triblock copolymers, respectively.

Suitable hydrogenated block copolymers include those commercially available as, for example, KRATON® G1650, G1651, and G1652 available from Kraton Polymers (formerly a division of Shell Chemical Company), and TUFTEC® H1041, H1043, H1052, H1062, H 1141, and H1272 available from Asahi Chemical.

Exemplary non-hydrogenated block copolymers include polystyrene-polybutadiene, polystyrene-poly(ethylene-propylene), polystyrene-polyisoprene, poly(α-methylstyrene)-polybutadiene, polystyrene-polybutadiene-polystyrene (SBS), polystyrene-poly(ethylene-propylene)-polystyrene, polystyrene-polyisoprene-polystyrene and poly(alpha-methylstyrene)-polybutadiene-poly(alpha-methylstyrene), as well as combinations of the foregoing.

Suitable non-hydrogenated block copolymers are available commercially from a number of sources, including Phillips Petroleum under the trademark SOLPRENE, Shell Chemical Co., under the trademark KRATON, Dexco under the trademark VECTOR, and Kuraray under the trademark SEPTON.

The second type of impact modifier includes functionalized elastomeric polyolefins. Functionalized elastomeric polyolefins contain at least one functional group selected from the group consisting of carboxylic acid groups, esters, acid anhydrides, epoxy groups, oxazoline groups, carbodiimide groups, isocyanate groups, silanol groups, carboxylates, and combinations of two or more of the foregoing functional groups. The elastomeric polyolefin is a polyolefin miscible with the polyamide and includes linear random copolymers, linear block copolymer and core-shell type copolymers wherein the shell is miscible with polyamide and comprises a functional group reactive with the polyamide. Exemplary elastomeric polyolefins include polyethylene, ethylene-vinyl acetate copolymer (EVA), ethylene-ethylacrylate copolymer (EEA), ethylene-octene copolymer, ethylene-propylene copolymer, ethylenebutene copolymer, ethylene-hexene copolymer, ethylene-propylene-diene terpolymers and combinations of the foregoing. Monomers comprising the functional group may be graft-polymerized with the polyolefin or co-polymerized with the polyolefin monomers. In one embodiment the structural units of the elastomeric polyolefin are derived from ethylene and at least one $C_{3-8}$ olefin, such as, propylene, 1-butene, 1-hexene, and 1-octene.

Suitable functionalized elastomeric polyolefins are available commercially from a number of sources, including DuPont under the trademark ELVALOY.

The composition may comprise the first impact modifier in an amount of 1 to 15 weight percent, based on the combined weight of poly(arylene ether), polyamide and impact modifier. Within this range the amount of the first impact modifier may be greater than or equal to 1.5, or, more specifically greater than or equal to 2 weight percent. Also within this range the amount of first impact modifier may be less than or equal to 13, or, more specifically less than or equal to 10 weight percent.

Similarly the composition may comprise the second impact modifier in an amount of 1 to 15 weight percent, based on the combined weight of poly(arylene ether), polyamide and impact modifier. Within this range the amount of the second impact modifier may be greater than or equal to 1.5, or, more specifically greater than or equal to 2 weight percent. Also within this range the amount of second impact modifier may be less than or equal to 13, or, more specifically less than or equal to 10 weight percent.

In one embodiment the ratio of the amount of the first impact modifier, in weight percent, to the amount of the second impact modifier, also in weight percent, may be 3:1 to 1:3, or, more specifically, 2:1 to 1:2, or, even more specifically, 1.5:1 to :1.5.

The composition can be prepared melt mixing or a combination of dry blending and melt mixing. Melt mixing can be performed in single or twin screw type extruders or similar mixing devices which can apply a shear to the components.

All of the ingredients may be added initially to the processing system. In one embodiment, the poly(arylene ether), optionally other ingredients such as the first impact modifier, and optionally the second impact modifier and a portion of the polyamide may be precompounded with the compatibilizing agent. When the polyamide is added in two portions, the remaining portion of the polyamide and optionally the second impact modifier, is added after the first ingredients have been mixed. When using an extruder, the second portion of polyamide may be fed through a port downstream. While separate extruders may be used in the processing, preparations in a single extruder having multiple feed ports along its length to accommodate the addition of the various components simplifies the process. It is often advantageous to apply a vacuum to the melt through one or more vent ports in the extruder to remove volatile impurities in the composition.

The composition may further comprise effective amounts of at least one additive selected from the group consisting of anti-oxidants; flame retardants;, drip retardants; dyes; pigments; colorants; stabilizers; small particle mineral such as clay, mica, and talc; reinforcing agents such as long glass fibers and chopped glass fibers; electrically conductive filler; antistatic agents; plasticizers; lubricants; blowing agents; and mixtures thereof. These additives are known in the art, as are their effective levels and methods of incorporation. Effective amounts of the additives vary widely, but they are usually present in an amount up to 50% or more by weight, based on the weight of the entire composition. Some additives such as hindered phenols, thio compounds and amides derived from various fatty acids are generally present in amounts 2% total combined weight based on the total weight of the composition.

Exemplary flame retardants include halogenated flame retardants; organic phosphates including cyclic phosphates; compounds containing phosphorus-nitrogen bonds, such as phosphonitrilic chloride, phosphorus ester amides; phosphoric acid amides, phosphonic acid amides, phosphinic acid amides, tris(aziridinyl) phosphine oxide; tetrakis(hydroxymethyl) phosphonium chloride; mono-, di-, and polymeric phosphinates, magnesium hydroxide, magnesium carbonate, red phosphorus; melamine polyphosphate; melem phosphate, melam phosphate; melamine pyrophosphate; melamine; melamine cyanurate; zinc compounds such as zinc borate; and combinations comprising at least one of the foregoing. Flame retardants are typically used in amounts sufficient to provide the composition with sufficient flame retardance to pass a proscribed flame retardancy standard such as Underwriter's Laboratory Bulletin 94 entitled "Tests for Flammability of Plastic Materials, UL94". The relevant flame retardancy standard may be determined by the final application.

Exemplary electrically conductive filler include electrically conductive carbon black, carbon fibers, carbon fibrils, single wall carbon nanotubes, double wall carbon nanotubes and combinations of two or more of the foregoing.

The above described compositions may be converted to articles using common thermoplastic processes such as film and sheet extrusion, injection molding, gas-assist injection molding, extrusion molding, compression molding and blow molding. Film and sheet extrusion processes may include and are not limited to melt casting, blown film extrusion and calendaring. Co-extrusion and lamination processes may be employed to form composite multi-layer films or sheets. Single or multiple layers of coatings may further be applied to the single or multi-layer substrates to impart additional properties such as scratch resistance, ultra violet light resistance, aesthetic appeal, etc. Coatings may be applied through standard application techniques such as rolling, spraying, dipping, brushing, or flow-coating. Film and sheet of the invention may alternatively be prepared by casting a solution or suspension of the composition in a suitable solvent onto a substrate, belt or roll followed by removal of the solvent.

Oriented films may be prepared through blown film extrusion or by stretching cast or calendared films in the vicinity of the thermal deformation temperature using conventional stretching techniques. For instance, a radial stretching pantograph may be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

The compositions may be converted to a multi-wall sheet comprising a first sheet having a first side and a second side, wherein the first sheet comprises a thermoplastic polymer, and wherein the first side of the first sheet is disposed upon a first side of a plurality of ribs; and a second sheet having a first side and a second side, wherein the second sheet comprises a thermoplastic polymer, wherein the first side of the second sheet is disposed upon a second side of the plurality of ribs, and wherein the first side of the plurality of ribs is opposed to the second side of the plurality of ribs.

The films and sheets described above may further be thermoplastically processed into shaped articles via forming and molding processes including but not limited to thermoforming, vacuum forming, pressure forming, injection molding and compression molding. Multi-layered shaped articles may also be formed by injection molding a thermoplastic resin onto a single or multi-layer film or sheet substrate as described below:

1. Providing a single or multi-layer thermoplastic substrate having optionally one or more colors on the surface, for instance, using screen printing or a transfer dye
2. Conforming the substrate to a mold configuration such as by forming and trimming a substrate into a three dimensional shape and fitting the substrate into a mold having a surface which matches the three dimensional shape of the substrate.
3. Injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including and not limited to heat-setting, texturing, embossing, corona treatment, flame treatment, plasma treatment and vacuum deposition may further be applied to the above articles to alter surface appearances and impart additional functionalities to the articles.

Accordingly, another embodiment relates to articles, sheets and films prepared from the compositions above.

The following non-limiting examples further illustrate the various embodiments described herein.

EXAMPLES

The following examples were prepared using the materials listed in Table I. The examples also contain less than 1 weight percent stabilizers and anti-oxidants. Weight percent, as used in the examples, was determined based on the total weight of the composition.

| Material Name | Material Description/Supplier |
| --- | --- |
| PPE | A polyphenylene ether with an intrinsic viscosity of 0.46 dl/g as measured in chloroform at 25° C. |
| SEBS | Polystyrene-poly(ethylene-butylene)-polystyrene impact modifier commercially available from Kraton Polymers as G 1651. |
| Functionalized polyolefin | An elastomeric polyolefin functionalized with butyl ester and epoxide functionalities, commercially available as Elvaloy PTW from DuPont |
| PA9T I | An aliphatic-aromatic polyamide having an amine end group content of 91 micromoles per gram of polyamide and a melt viscosity of 350 poise at a shear rate of 1000 $s^{-1}$ and 330° C. |
| PA9T II | An aliphatic-aromatic polyamide having an amine end group content of 10–20 micromoles per gram of polyamide and a melt viscosity of 350 poise at a shear rate of 1000 $s^{-1}$ and 330° C. |
| PA 6, 6 | An aliphatic polyamide commercially available from Solutia as Vydyne 21Z. |

-continued

| Material Name | Material Description/Supplier |
| --- | --- |
| Fumaric Acid | Available from Asland Chemical and used as a compatibilizing agent. |

The examples were tested for impact strength using ASTM D256 (Notched Izod, NI) at 23° C. and −30° C. Notched Izod values are reported in Joules per meters. Melt viscosity of the PA9T was determined by capillary viscometry.

Examples 1–7

Poly(arylene ether), impact modifier, and either citric acid, fumaric acid or maleic anhydride (as shown in Table II) were added at the feed throat of a 30 millimeter Werner and Pfleider twin screw extruder and melt mixed at a screw speed of 350 rotations per minute and a feed rate of 13.6 kilograms per hour and a temperature of 305° C. The polyamide was added downstream. The material was pelletized and formed by injection molding the pellets and tested for Notched Izod impact strength. Formulations and results are shown in Table II.

TABLE II

| Component | 1* | 2* | 3* | 4* | 5* | 6* | 7 |
| --- | --- | --- | --- | --- | --- | --- | --- |
| PPE | 38.6 | 38.6 | 38.6 | 38.6 | 38.6 | 38.6 | 38.6 |
| PA9T I | — | — | — | — | 50 | 50 | 50 |
| PA9T II | 50 | — | — | — | — | — | — |
| PA6,6 | — | 50 | 50 | 50 | — | — | — |
| SEBS | 10 | 10 | — | 5 | 10 | — | 5 |
| Functionalized polyolefin | — | — | 10 | 5 | — | 10 | 5 |
| Fumaric Acid | 0.5 | 0.5 | 0.5 | 0.5 | 0.5 | 0.5 | 0.5 |
| Notched Izod: 23° C. | 75.6 | 502 | 137 | 503 | 254 | 199 | 273 |
| Notched Izod: −30° C. | 54.2 | 143 | 75 | 146 | 173 | 134 | 194 |

*Comparative Example

Example 1, when compared to the remaining examples, demonstrates that a composition made using an aliphatic-aromatic polyamide having low amine end group content has poor physical properties. The composition, when formed by injection molding, demonstrated delamination.

A comparison of the Notched Izod values for the compositions employing an aliphatic polyamide (Examples 2–4) shows that use of a combination of two types of impact modifier does not improve the impact strength. In contrast, a comparison of the Notched Izod values for the compositions employing an aliphatic-aromatic polyamide (Examples 5–7) shows that use of a combination of two types of impact modifier results in a marked improvement in the impact strength.

While the invention has been described with reference to various embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents are incorporated by reference herein.

The invention claimed is:

1. A composition comprising:
a first impact modifier comprising a block copolymer of an alkenyl aromatic compound and a conjugated diene, a hydrogenated block copolymer of an alkenyl aromatic compound and a conjugated diene or a combination thereof;
a second impact modifier comprising a functionalized elastomeric polyolefin wherein the functionalized elastomeric polyolefin comprises at least one functional group selected from the group consisting of carboxylic acid, ester, acid anhydride, epoxy, oxazoline, carbodiimide, isocyanate, silanol, carboxylate, and combinations of two or more of the foregoing functional groups; and
a compatibilized blend of a poly(arylene ether) and an aliphatic-aromatic polyamide wherein, prior to forming the compatibilized blend, the aliphatic-aromatic polyamide has an amine end group content greater than 45 micromoles per gram of polyamide and the aliphatic-aromatic polyamide comprises
units derived from a of dicarboxylic acid wherein 60 to 100 mol % of units derived from a dicarboxylic acid are derived from terephthalic acid and
units derived from a diamine wherein 60 to 100 mol % of the units derived from a diamine are derived from 1,9-nonanediamine, 2-methyl-1,8-octanediamine units or a combination of 1,9-nonanediamine and 2-methyl-1,8-octanediamine and further wherein the compatibilized blend of poly(arylene ether) and an aliphatic-aromatic polyamide is the reaction product of the poly(arylene ether), the aliphatic-aromatic polyamide, and a monomeric compatibilizing agent.

2. The composition of claim 1 wherein the composition has a Notched Izod value at 23° C. greater than or equal to 200 Joules per meter, as measured by ASTM D 256.

3. The composition of claim 1 wherein the composition has a Notched Izod value at −30° C. greater than or equal to 150 Joules per meter, as measured by ASTM D 256.

4. The composition of claim 1, wherein the poly(arylene ether) is present in an amount of 10 to 70 weight percent and the aliphatic-aromatic polyamide is present in an amount of 5 to 80 weight percent, based on the combined weight of poly(arylene ether), aliphatic-aromatic polyamide and impact modifier.

5. The composition of claim 1, wherein the molar ratio of 1,8-nonanediamine to 2-methyl-1,8-octanediamine is 100:0 to 20:80.

6. The composition of claim 1, wherein the amine end group content is greater than or equal to 50 micromoles.

7. The composition of claim 1, wherein the aliphatic-aromatic polyamide has an intrinsic viscosity of 0.4 to 3.0 dl/g when measured in concentrated sulfuric acid.

8. The composition of claim 1, wherein the compatibilized blend of a poly(arylene ether) and an aliphatic-aromatic polyamide further comprises an aliphatic polyamide.

9. The composition of claim 1, wherein the compatibilizing agent is selected from the group consisting of polyfunctional compounds having both a carbon-carbon double bond and at least one carboxylic acid, anhydride, epoxy, imide, amide, or ester group; polyfunctional compounds having both a group represented by the formula (OR) wherein R is hydrogen or an alkyl, aryl, acyl or carbonyl dioxy group and at least two groups selected from carboxylic acid, acid halide, anhydride, acid halide anhydride, ester, orthoester, amide, imido, amino, and salts thereof; and combinations of two or more of the foregoing polyfunctional compounds.

10. The composition of claim 9, wherein the compatibilizing agent comprises citric acid, fumaric acid, maleic anhydride or a combination of two or more of the foregoing.

11. The composition of claim 1, wherein the first impact modifier is present in an amount of 1 to 15 weight percent, based on the combined weight of poly(arylene ether), aliphatic-aromatic polyamide and impact modifier.

12. The composition of claim 1, wherein the second impact modifier is present in an amount of 1 to 15 weight percent, based on the combined weight of poly(arylene ether), aliphatic-aromatic polyamide and impact modifier.

13. The composition of claim 1, wherein the ratio of the first impact modifier to the second impact modifier is 1:3 to 3:1.

14. The composition of claim 1, wherein the alkenyl aromatic content of the block copolymer of an alkenyl aromatic compound and a conjugated diene is 20 to 90 weight percent based on the total weight of the block copolymer.

15. The composition of claim 1, wherein the alkenyl aromatic content of the hydrogenated block copolymer of an alkenyl aromatic compound and a conjugated diene is 20 to 90 weight percent based on the total weight of the block copolymer.

16. The composition of claim 1, wherein the functionalized elastomeric polyolefin comprises structural units derived from ethylene and at least one $C_{3-8}$ olefin.

17. The composition of claim 1, further comprising an anti-oxidant, flame retardant, drip retardant, dye, pigment, colorant, stabilizer, small particle mineral, reinforcing agent, electrically conductive filler, antistatic agent, plasticizer, lubricant, blowing agent or a mixtures comprising two or more of the foregoing.

18. An article comprising the composition of claim 1.

19. A composition comprising the reaction product of:
a first impact modifier comprising a block copolymer of an alkenyl aromatic compound and a conjugated diene, a hydrogenated block copolymer of an alkenyl aromatic compound and a conjugated diene or a combination thereof;
a second impact modifier comprising a functionalized elastomeric polyolefin wherein the functionalized elastomeric polyolefin comprises at least one functional group selected from the group consisting of carboxylic acid, ester, acid anhydride, epoxy, oxazoline, carbodiimide, isocyanate, silanol, carboxylate, and combinations of two or more of the foregoing functional groups;
a poly(arylene ether);
an aliphatic-aromatic polyamide wherein the polyamide comprises
units derived from a dicarboxylic acid wherein 60 to 100 mol % of units derived from a dicarboxylic acid are derived from terephthalic acid and
units derived from a diamine wherein 60 to 100 mol % of the units derived from a diamine are derived from 1,9-nonanediamine units, 2-methyl-1,8-octanediamine units or a combination of 1,9-nonanediamine and 2-methyl-1,8-octanediamine and the polyamide has an amine end group content greater than 45 micromoles per gram of polyamide; and
a monomeric compatibilizing agent selected from polyfunctional compounds having both a carbon-carbon double bond and at least one carboxylic acid, anhydride, epoxy, imide, amide, or ester group; polyfunctional compounds having both a group represented by the formula (OR) wherein R is hydrogen or an alkyl, aryl, acyl or carbonyl dioxy group and at least two groups selected from carboxylic acid, acid halide, anhydride, acid halide anhydride, ester, orthoester, amide, imido, amino, and salts thereof; and combinations of two or more of the foregoing polyfunctional compounds.

20. A composition consisting essentially of:

a hydrogenated block copolymer;

a functionalized elastomeric polyolefin wherein the functionalized elastomeric polyolefin comprises at least one functional group selected from the group consisting of carboxylic acid, ester, acid anhydride, epoxy, oxazoline, carbodiimide, isocyanate, silanol, carboxylate, and combinations of two or more of the foregoing functional groups; and a compatibilized blend of a poly(arylene ether) and an aliphatic-aromatic polyamide wherein, prior to forming the compatibilized blend, the aliphatic-aromatic polyamide has an amine end group content greater than 45 micromoles per gram of polyamide and the aliphatic-aromatic polyamide comprises:

units derived from a dicarboxylic acid wherein 60 to 100 mol % of units derived from a dicarboxylic acid are derived from terephthalic acid and units derived from a diamine wherein 60 to 100 mol % of the units derived from a diamine are derived from 1,9-nonanediamine, 2-methyl-1,8-octanediamine, or a combination of 1,9-nonanediamine and 1-methyl-1,8-octanediamine wherein the compatibilized blend of poly(arylene ether) and an aliphatic-aromatic polyamide is the reaction product of the poly(arylene ether), the aliphatic-aromatic polyamide, and a monomeric compatibilizing agent.

* * * * *